Feb. 23, 1960     E. C. NETTERFIELD     2,926,223
ELECTRICAL CONTROL
Filed July 2, 1957
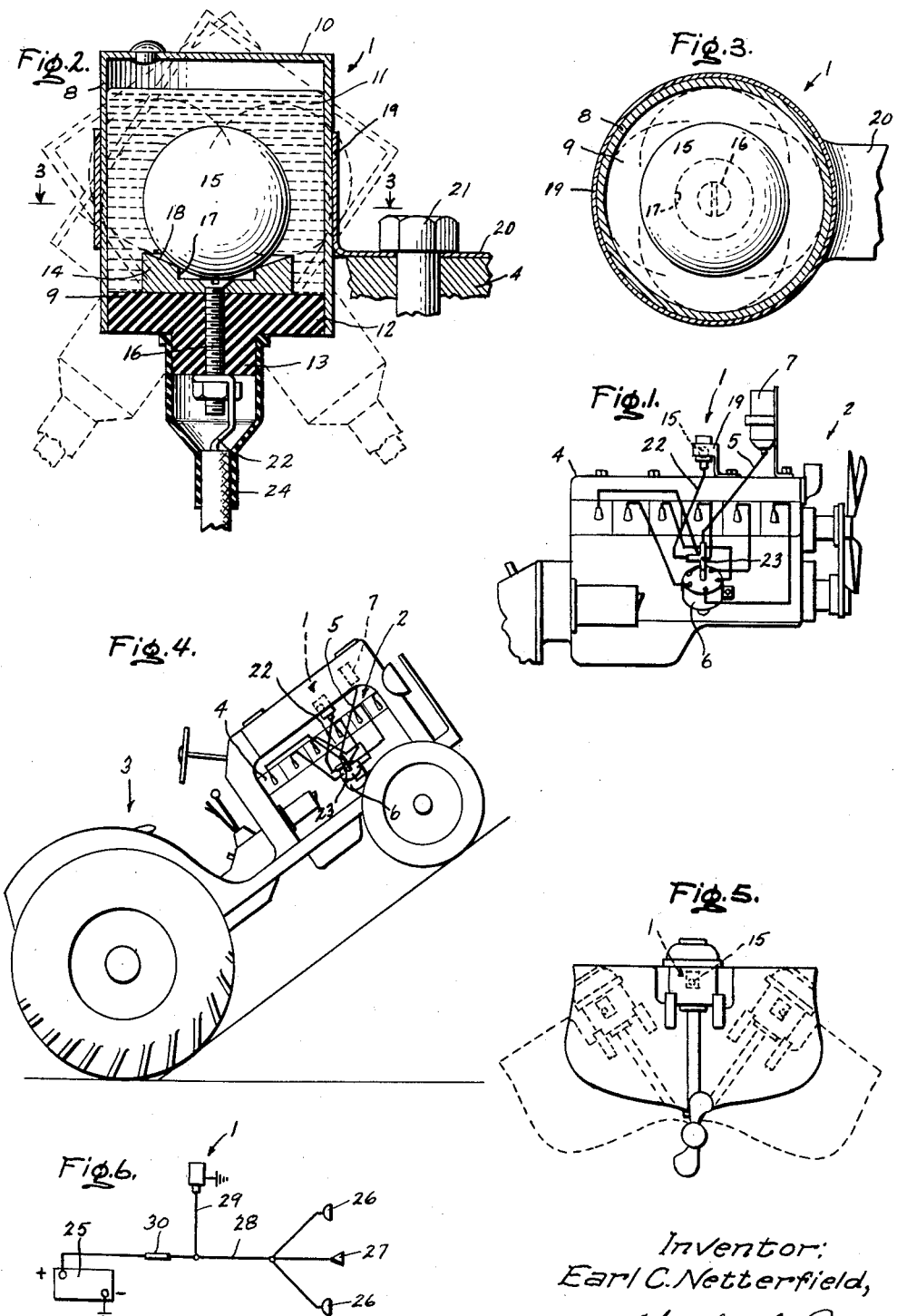
Inventor:
Earl C. Netterfield,
by Charles S. Penfold
Attorney.

United States Patent Office 2,926,223
Patented Feb. 23, 1960

2,926,223

ELECTRICAL CONTROL

Earl C. Netterfield, Fort Wayne, Ind.

Application July 2, 1957, Serial No. 669,559

1 Claim. (Cl. 200—61.52)

The invention relates generally to safety devices and more particularly is directed to a device or control adapted for use in the electrical system of an automotive vehicle for automatically rendering the system inoperative whenever the vehicle is driven abnormally. For example, whenever a vehicle is tilted a predetermined extent in traveling over a steep incline or grade which is not safe under normal operating conditions, the device will automatically shut off the motor, prevent further travel and thereby promote safety. The invention also affords a setup whereby any sudden or abrupt turn or shock imparted to the vehicle will either stop or temporarily interrupt the operation of its motor. Thus, provision is made to safeguard the life of a driver and possible damage to a vehicle by preventing same from tipping over.

It is recognized that various means or safety devices heretofore been employed for automatically stopping the motor of a vehicle when operated under abnormal conditions of use. Some of the devices utilized for this purpose are comprised of a multitude of small intricate components or parts which are difficult to manufacture and assemble and require periodic adjustment, while others are of such a character that they have to be incorporated as original equipment, as distinguished from an item that can be installed as an accessory. Also, some devices are fragile, inefficient and so constructed that they do not readily lead themselves for use with all conventional motor systems.

With the foregoing in mind, one of the important objects of the invention is to provide a device and/or system which can be easily and quickly installed for use as an accessory or incorporated as original equipment in any conventional motor system.

A significant object of the invention is to provide a device and/or system comprising a minimum number of components or parts which can be economically manufactured and assembled on a production basis.

More particularly, an important object of the invention is to provide an assembly comprising, among other things, a sealed metal housing containing a liquid, a metal seat disposed in the housing and insulated therefrom, and a ball of a predetermined diameter arranged in the housing for normally engaging the seat. The seat is preferably adapted for electrical connection with a distributor and the housing is preferably grounded so that whenever the ball rolls on the seat and engages the housing any current flowing through a line from an electrical source, such as a battery, to the engine will be shorted out and thereby prevent operation of the motor.

Another object of the invention is to provide a setup whereby the ball is continuously lubricated and stabilized in its movement by the liquid and the seat is always maintained in a clean state or condition by movement of the ball thereon.

A further object of the invention is to provide an organization whereby the internal parts are sealed and protected and after once being assembled will never require resetting or readjustment.

Also, an object of the invention is to construct the ball, seat and housing in such a manner that the ball will automatically roll or return to its normal position on the seat after the vehicle is driven from a steep incline back to a substantially horizontal or level condition.

A specific object of the invention is to provide a fuse in a main line of a particular installation so that when shorting occurs, the fuse will blow to promote safety and at the same time completely cut off the supply of current to all electrically operated components including the lamps.

An additional object of the invention is to provide a device and/or system which offers advantages with respect to durability, simplicity of construction and efficiency in operation.

Other objects and advantages of the invention will become apparent after the description hereinafter set forth is considered in conjunction with the drawings annexed hereto.

In the drawings:

Figure 1 is a side elevational view of a motor of a vehicle showing the device applied thereto;

Figure 2 is a vertical section of the device illustrating structural details thereof and mode of mounting same;

Figure 3 is a transverse section taken substantially on line 3—3 of Figure 2;

Figure 4 is a view showing a vehicle disposed at an angle which will cause the device thereon to automatically shut off the motor;

Figure 5 is a modified structure exemplifying use of the device in conjunction with a motor on a boat for rendering the motor inoperative when the boat attains an abnormal tilted condition; and Figure 6 is a diagrammatic view exemplifying use of a fuse in a system embodying the invention.

Referring more particularly to the drawings, numeral 1 generally designates the device, embodying the invention, as applied to a motor 2 of a vehicle 3. The device may be installed and used wherever desired, but as shown, is preferably adapted to be mounted on the head 4 of the motor and connected in a line 5 or conductor connecting a distributor 6 with a coil 7.

The device may be designed and constructed in various ways but as illustrated, preferably includes, among other things, a housing comprising a metal cylinder or part 8, a bottom wall 9 and an integral top wall 10. The cylinder and top wall constitute an inverted cup. The bottom wall is preferably in the form of an insulator or dielectric material, which is sealed in place to retain a suitable liquid 11, such as oil, in the housing. The bottom wall 9 includes an inner annular portion 12 disposed in the cylinder and an annular axial extension 13 located exteriorly of the cylinder. The device also includes a metal contact member 14 and a metal ball 15. The member is firmly secured against the upper surface of the inner annular portion of the bottom wall by conductor means preferably in the form of a bolt 16 which extends through a center hole in the member and an axial aperture in the bottom wall. The member is provided with an upper center annular recess 17 which is counter-recessed to provide a tapered, conical or concave seat or pocket 18. The ball is adapted to normally rest centrally on the seat and extend into the recess 14 which affords clearance for the ball. The diameter of the ball, seat and cylinder are preferably such that the ball may normally rest, rock or roll in the seat radially and/or circumferentially, but when the vehicle is subjected to abnormal shock or tilting, the ball will be displaced to engage the rim of the seat and the inner surface of the cylinder 8, as depicted by the dotted lines in Figure 2, which will effect a short circuit. During normal operations, the ball will continuously rock or jiggle on the seat and thereby assist in maintaining the seat in a good clean state or condition. The liquid serves to stabilize or normalize the motion of the ball on the seat and also functions as a lubricant and in preventing corrosive action between the ball and seat during arcing. The housing is substantially filled with the liquid with sufficient space allowed for expansion thereof.

A bracket comprising a tubular member 19 is preferably secured about the cylinder or housing and provided with an offset 20 with an aperture therein through which a fastener, such as a head screw 21, may be extended into the motor head 4 as shown in Figure 2 to detachably mount the device in a firm operative or vertical position. The bracket also affords an electrical ground connection for the cylinder of the housing. An electrical conductor 22 is detachably secured to the lower end of the bolt 16 and to the conductor or line 5, above referred to, preferably through a T-connector 23. A rubber sleeve 24 may be detachably secured to the axial extension 13 of the bottom wall 9 and about the connection between the conductor and bolt 16 to insulate and fully protect such connection.

In view of the foregoing it will be manifest that whenever the vehicle or tractor 3 is driven substantially normally in a horizontal direction, the ball 15 may move on the seat without engaging the metal cylinder wall 8, but when the vehicle is driven up or down a steep incline or grade, as depicted in Figure 4, the ball will fall by gravity and engage the wall 8 as illustrated by the dotted lines in Figure 2, which will effect a short circuit and cut off the supply of current to the motor and thereby stop the motor to prevent further travel of the vehicle toward a greater and dangerous angle which would cause the vehicle to tip over and perhaps kill or seriously injure the driver and/or damage the vehicle beyond repair. The taper or concavity of the seat is predetermined or set preferably at approximately 35 degrees so that when the vehicle reaches or substantially approaches that angle to the horizontal the ball will be displaced to effect the short circuit before the vehicle reaches or approaches the dangerous angle of 45 degrees.

It is to be understood that the member 14 may be constructed to vary the character or shape of the seat so that if desired the ball can be made to engage the metal cylindrical wall 8 of the housing at different inclinations of the vehicle. For example, the depth of the seat and/or its diameter may be decreased or increased so that the ball will effect a short circuit when the vehicle is driven on an incline of less than 35 degrees or between 35 and 45 degrees inclusive. The periodicity of the automatic short circuiting can be accomplished by varying the diameter of the ball and/or modifying to some extent the diameter of the metal cylinder. Obviously, provision may be made to effect a shorting of a circuit at any angle.

As illustrated in Figure 5 of the drawing, the device may be attached to an outboard motor on a boat to render the motor inoperative when the boat attains a critical angle toward tipping over as depicted by the dotted lines. The device may also be used on a lawn mower or other motor operated assembly or unit.

In Figure 6 of the drawing there is exemplified a diagrammatic view of a setup or system embodying the device and a fuse. More particularly in this regard, the setup comprises a source of power such as a battery 25 connected to a plurality of components such as headlamps 26, a horn 27 and the like by a conductor 28, a device 1 embodying the invention connected to the conductor 28 by a conductor 29, and a fuse 30 interposed in the conductor 28 between the battery and device. The device and components are preferably grounded on a vehicle. The organization is such that when a vehicle or other structure carrying the system is inclined at a predetermined angle to the horizontal, the ball will effect a short circuit and blow the fuse and thereby render the components inoperative until service can be restored by inserting a new fuse.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

An electric switch adapted for normally vertical installation comprising a base constructed of insulating material, said base including an annular portion and an integral depending cylindrical portion, an annular metal contact member supported on the upper surface of the annular portion, said member being provided with a concave seat and a central recess below the seat, a terminal fastener having a head disposed in the recess, a shank extending axially through the member and base to locate its lower end below the depending portion for connection with a conductor, and means connected to the lower end of the shank for firmly securing the member in place and the head in a fixed position in the recess, a relatively large metal ball mounted in the seat, an inverted cylindrical metal cup having its lower end secured in embracing relationship with the annular portion of the base and its cylindrical wall in concentric spaced relationship to the member and ball, means carried by the cup for supporting and connecting it in an electrical circuit with the shank when the ball is dislodged from its seat for simultaneous engagement with the member and cup.

References Cited in the file of this patent

UNITED STATES PATENTS

| | | |
|---|---|---|
| 1,611,219 | Minninger | Dec. 21, 1926 |
| 1,662,979 | Nelson | Mar. 20, 1928 |
| 1,915,267 | Bigelow | June 27, 1933 |
| 2,174,846 | Soulat | Oct. 3, 1939 |
| 2,365,262 | Gair | Dec. 19, 1944 |
| 2,487,433 | Gardenhour | Nov. 8, 1949 |
| 2,601,142 | Hubbard | June 17, 1952 |

FOREIGN PATENTS

| | | |
|---|---|---|
| 676,356 | Germany | June 2, 1939 |